US010389127B2

(12) United States Patent
Kumagai et al.

(10) Patent No.: US 10,389,127 B2
(45) Date of Patent: Aug. 20, 2019

(54) POWER SYSTEM STABILIZATION SYSTEM (71) Applicant: Hitachi, Ltd., Tokyo (JP)

(72) Inventors: Masatoshi Kumagai, Tokyo (JP); Yukihiro Takatani, Tokyo (JP); Shota Omi, Tokyo (JP); Kenichiro Yamane, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 88 days.

(21) Appl. No.: 15/554,273

(22) PCT Filed: Mar. 9, 2015

(86) PCT No.: PCT/JP2015/056791
§ 371 (c)(1),
(2) Date: Aug. 29, 2017

(87) PCT Pub. No.: WO2016/143021
PCT Pub. Date: Sep. 15, 2016

(65) Prior Publication Data
US 2018/0054058 A1  Feb. 22, 2018

(51) Int. Cl.
*H02J 3/18* (2006.01)
*H02J 3/24* (2006.01)
(Continued)

(52) U.S. Cl.
CPC ............... *H02J 3/24* (2013.01); *G06Q 50/06* (2013.01); *H02J 3/18* (2013.01); *H02J 13/00* (2013.01);
(Continued)

(58) Field of Classification Search
CPC .. H02J 3/24; H02J 3/18; H02J 13/0006; H02J 13/00; G06Q 50/06; Y02E 40/74; Y02E 40/30; Y04S 10/22
(Continued)

(56) References Cited

U.S. PATENT DOCUMENTS 5,698,968 A * 12/1997 Takagi ............... H02P 9/105
322/25
6,337,561 B1 * 1/2002 Sudou ............... H02P 9/105
322/19
(Continued)

FOREIGN PATENT DOCUMENTS

JP  04-069017 A  3/1992
JP  08-280138 A  10/1996
(Continued)

OTHER PUBLICATIONS

International Search Report of PCT/JP2015/056791 dated May 26, 2015.

*Primary Examiner* — Brian W Wathen
*Assistant Examiner* — Mohammed Shafayet
(74) *Attorney, Agent, or Firm* — Mattingly & Malur, PC (57) ABSTRACT A system stabilization system (101) is provided with: at least one of a power flow state database (DB2) and a system configuration database (DB3); a device state database (DB1) in which the device states of a stabilizing device are recorded; a stabilizing effect index calculation function (204) for indexing the stabilizing effect of the stabilizing device on the basis of a device state and one or both of a power flow state and a system configuration; and a display means for displaying or outputting a stabilizing effect index obtained by the stabilizing effect index calculation function, in contrast with contrasted elements included in the device state, the power flow state, and the system configuration.

20 Claims, 7 Drawing Sheets (51) Int. Cl.
*G06Q 50/06* (2012.01)
*H02J 13/00* (2006.01)

(52) U.S. Cl.
CPC ........... *H02J 13/0006* (2013.01); *Y02E 40/30* (2013.01); *Y02E 40/74* (2013.01); *Y04S 10/22* (2013.01)

(58) Field of Classification Search
USPC ........................................................ 700/295
See application file for complete search history.

(56) References Cited

U.S. PATENT DOCUMENTS

| | | | | |
|---|---|---|---|---|
| 2003/0057924 A1* | 3/2003 | Shimomura | ............ | H02P 9/305 322/28 |
| 2003/0076075 A1* | 4/2003 | Ma | ................. | H02J 3/1864 323/209 |
| 2003/0200038 A1* | 10/2003 | Schweitzer, III | .... | H02H 1/0007 702/65 |
| 2009/0088990 A1* | 4/2009 | Schweitzer, III | .. | G01R 19/2513 702/58 |
| 2011/0050139 A1* | 3/2011 | Ichiki | ..................... | H02P 23/26 318/400.34 |
| 2012/0271575 A1* | 10/2012 | Tumilty | ..................... | H02J 3/38 702/60 |
| 2013/0073109 A1* | 3/2013 | Cheng | ....................... | H02J 3/40 700/298 |
| 2013/0116842 A1* | 5/2013 | Saito | ....................... | H02J 13/00 700/291 |
| 2013/0265030 A1* | 10/2013 | Kuroda | .................. | H02J 3/386 323/318 |
| 2015/0001939 A1* | 1/2015 | Kojima | .................... | G06G 7/14 307/52 |
| 2015/0042093 A1* | 2/2015 | Gomis Bellmunt | ...... | H02J 3/24 290/44 |
| 2015/0194966 A1* | 7/2015 | Kimura | ..................... | H02J 3/04 700/287 |

FOREIGN PATENT DOCUMENTS

| | | |
|---|---|---|
| JP | 2000-224897 A | 8/2000 |
| JP | 2013-198177 A | 9/2013 |

\* cited by examiner

POWER SYSTEM STABILIZATION SYSTEM

TECHNICAL FIELD

The present invention relates to a power system stabilization system which improves stability of a power system.

BACKGROUND ART

Stability of a power system includes synchronization stability, voltage stability, and frequency stability. The synchronization stability is derived from the fact that a main power generator of the power system is a synchronizing power generator. The synchronizing power generator has a phase angle of a rotor which differs depending on an interconnection position on the power system, but basically operates synchronously at the same rotation speed. However, if disturbance such as a system failure, for example, a ground fault or the like, or a sudden change of an output of a distribution power source occurs, the phase angle of the synchronizing power generator fluctuates. If the phase angle fluctuation expands and propagates, the synchronizing power generator cannot be synchronized with the rotation speed, thereby, leading to step-out.

In order to attenuate the phase angle fluctuations, a stabilizing device is installed in the power system. Specifically, by changing an excitation voltage of a power generator, changing an output of active power or reactive power of a power storage device, or changing impedance of a variable impedance type series capacitor, the phase angle fluctuation is attenuated, and thereby, the stability of the power system can be improved.

A control device for controlling the stabilizing device detects a signal which varies in accordance with the phase angle fluctuation, for example, a line power flow or a frequency deviation, and outputs a control signal by increasing a gain or compensating a phase for the signal. A stabilizing effect according to a control parameter such as a magnitude of the gain or a time constant of phase compensation differs depending on a device state of the stabilizing device which is a control target or a power flow state of the power system.

For this reason, a method for determining the control parameters of the stabilizing device is reviewed, and there is a technology described in, for example, PTL 1. PTL 1 discloses that "a configuration is provided such that a ratio of addition of the amount of control operation which is an output of a plurality of control means is changed on the basis of a magnitude of fluctuation detected from an input signal of operation amount control means, and thus, effects are obtained in which a circuit capable of determining a ratio of the amount of control operation can be realized without requiring a complicated circuit, a ratio of cooperation according to a magnitude of fluctuation can be easily controlled, and thereby, fluctuation in a wide frequency range can be reduced and stability of a power generator can be improved".

CITATION LIST

Patent Literature

PTL 1: JP-A-8-280138

SUMMARY OF INVENTION

Technical Problem

In the technology described in PTL 1, the ratio of addition of the amount of control operation which is outputs of a plurality of control means is changed, and thereby, the phase angle fluctuation in the wide frequency range can be controlled. However, since the technology controls a single stabilizing device, an effect is not obtained in which the stability of the power system is improved by the control performed by combining a plurality of stabilizing devices. In addition, recently, there is a case where an operator of a power transmission system procures adjusting power supplied by the stabilizing device from an operator of the stabilizing device through a power transaction market, but price determination means according to a magnitude of a stabilizing effect is required for fair procurement price.

The present invention is made to solve the above problems, and an object thereof is to improve stability of a power system by indexing the stabilizing effect according to a device state of a stabilizing device and a power flow state of a power system, procuring adjusting power by prioritizing the stabilizing device with a large stabilizing effect, and controlling the stabilizing device in accordance with a magnitude of the stabilizing effect.

Solution to Problem

From the above, the invention provides a power system stabilization system for operating a stabilizing device interconnected to a power system, including two or more device state databases including a device state database as a database, among the device state database in which a device state of the stabilizing device is recorded, a power flow state database in which a power flow state of the power system is recorded, and a system configuration database in which a system configuration of the power system is recorded; a stabilizing effect index calculation function of indexing a stabilizing effect of the stabilizing device on the basis of the device state and one or both of the power flow state and the system configuration; and display means which displays or outputs a stabilizing effect index obtained by the stabilizing effect index calculation function in contrast with contrasted elements that are included in the device state, the power flow state, and the system configuration.

In addition, the invention provides a power system stabilization system for operating a stabilizing device interconnected to a power system, including a stabilizing effect index calculation function of indexing a stabilizing effect of the stabilizing device by acquiring a device state of the stabilizing device, a power flow state of the power system, and a system configuration of the power system; and an output unit which displays a stabilizing effect index obtained by the stabilizing effect index calculation function, and the device state, the power flow state, and the system configuration that are input, by using a numerical value or a graph.

Advantageous Effects of Invention

According to the present invention, it is possible to improve stability of a power system by indexing the stabilizing effect according to a device state of a stabilizing device and a power flow state of a power system, procuring adjusting power by prioritizing the stabilizing device with a large stabilizing effect, and controlling the stabilizing device in accordance with a magnitude of the stabilizing effect.

BRIEF DESCRIPTION OF DRAWINGS

FIG. 7 is a scatter diagram illustrating the stabilizing devices with similar plot coordinates which are integrated by clustering or the like.

DESCRIPTION OF EMBODIMENTS

Hereinafter, embodiments of the present invention will be described with reference to the drawings.

Embodiment 1

Figure 1:
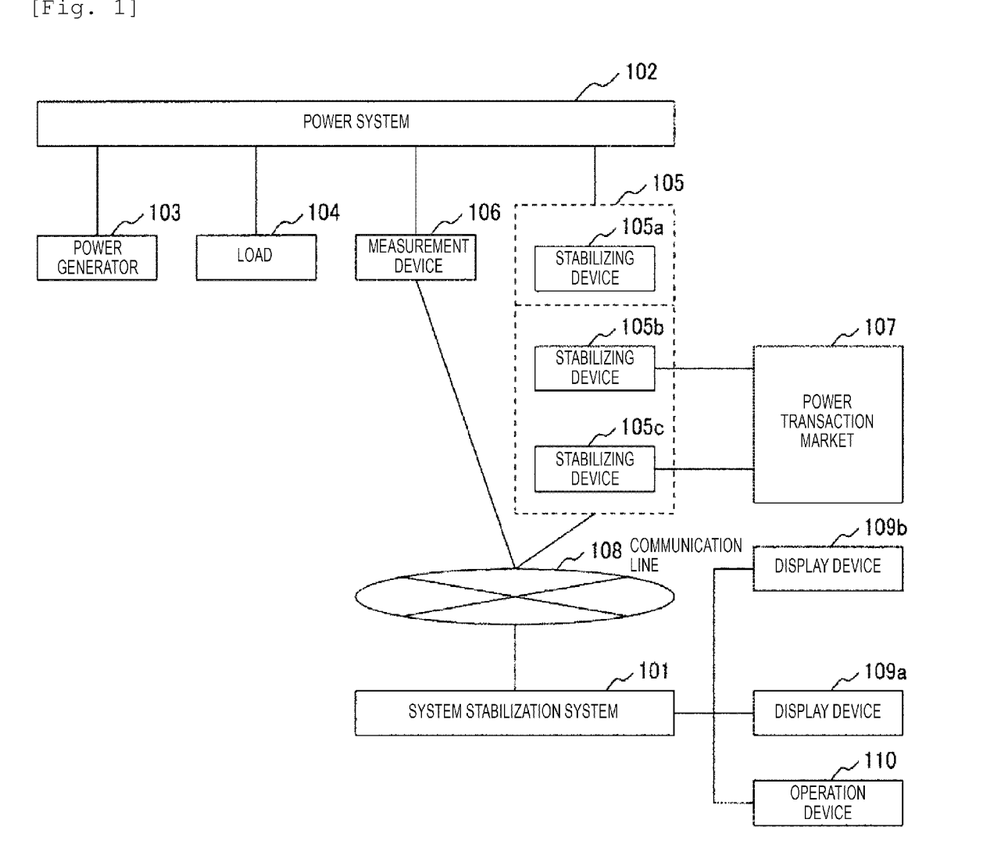
FIG. 1 is a diagram illustrating configuration devices of a power system and a system stabilization system.

FIG. 1 is a diagram illustrating configuration devices of a power system and a system stabilization system.

In FIG. 1, first, a power generator 103, a load 104, stabilizing devices 105 (105a, 105b, 105c), a measurement device 106, and the like are connected to a power system 102.

Here, the stabilizing device 105 is, for example, a synchronizing power generator including a PSS (Power System Stabilizer), a distribution power supply or a power storage device which can adjust an output, a STATCOM (Static Synchronous Compensator), a series capacitor and the like. The synchronizing power generator including the PSS also includes a gas turbine generator, and concept of the STATCOM includes an SVC (Static Var Compensater) and the like. The stabilizing device 105 has an effect in which, by adjusting an output of active power and reactive power or by adjusting line impedance, a line power flow is changed to attenuate phase angle fluctuation, and thereby synchronization stability of the power system is improved.

In the following description, things that possess and operate the stabilizing devices 105 have two types of operators, a system stabilization system operator and a stabilizing device operator. Among the stabilizing devices 105 in FIG. 1, 105a is a stabilizing device operated by the system stabilization system operator. Accordingly, the system stabilization system operator can perform synchronization stability improvement measures of the power system by operating the stabilizing device 105a without obtaining any permission under the determination of the system stabilization system operator.

In contrast to this, the stabilizing devices 105b and 105C are devices related to possession and operation of the stabilizing device operator. In addition, the stabilizing device 105b of the stabilizing devices is a device in which bidding performed by the stabilizing device operator is established with respect to a procurement price presented by the system stabilization system operator at a power transaction market and adjusting power is produced, among the stabilizing devices in which the adjusting power (controllable output capacitance) is transacted at the power transaction market 107. The stabilizing device 105c is a device in which the bidding is not established, among the stabilizing devices to which the adjusting power is transacted at the power transaction market 107.

As a result, in this case, the stabilizing devices 105 for which the system stabilization system operator can perform the synchronization stability improvement measures of the power system are 105a and 105b, and the amount of control that can contribute to stability improvement is determined by the stabilizing devices 105a and 105b. The amount of control that can contribute to the stability improvement changes with time by reflecting transaction in the power transaction market 107.

A system stabilization system 101 monitors device states of the stabilizing devices 105 and a power flow state of the power system 102 measured by the measurement device 106 via a communication line 108, and outputs control parameters to the stabilizing devices 105a and 105b which can be operated among the stabilizing devices 105.

Display devices 109 (109a, 109b) display stabilizing effects of the stabilizing devices 105 numerically or in a graph. The display device 109a is a display device used by the system stabilization system operator for confirming the stabilizing effects, and the display device 109b is a display device used by a stakeholder (interested parties) of the power transaction market such as a stabilizing device operator for confirming the stabilizing effects. In addition, an operation device 110 provides an interface for correcting the control parameters which are output to the stabilizing devices 105 to an operator of the system stabilization system.

Figure 2:
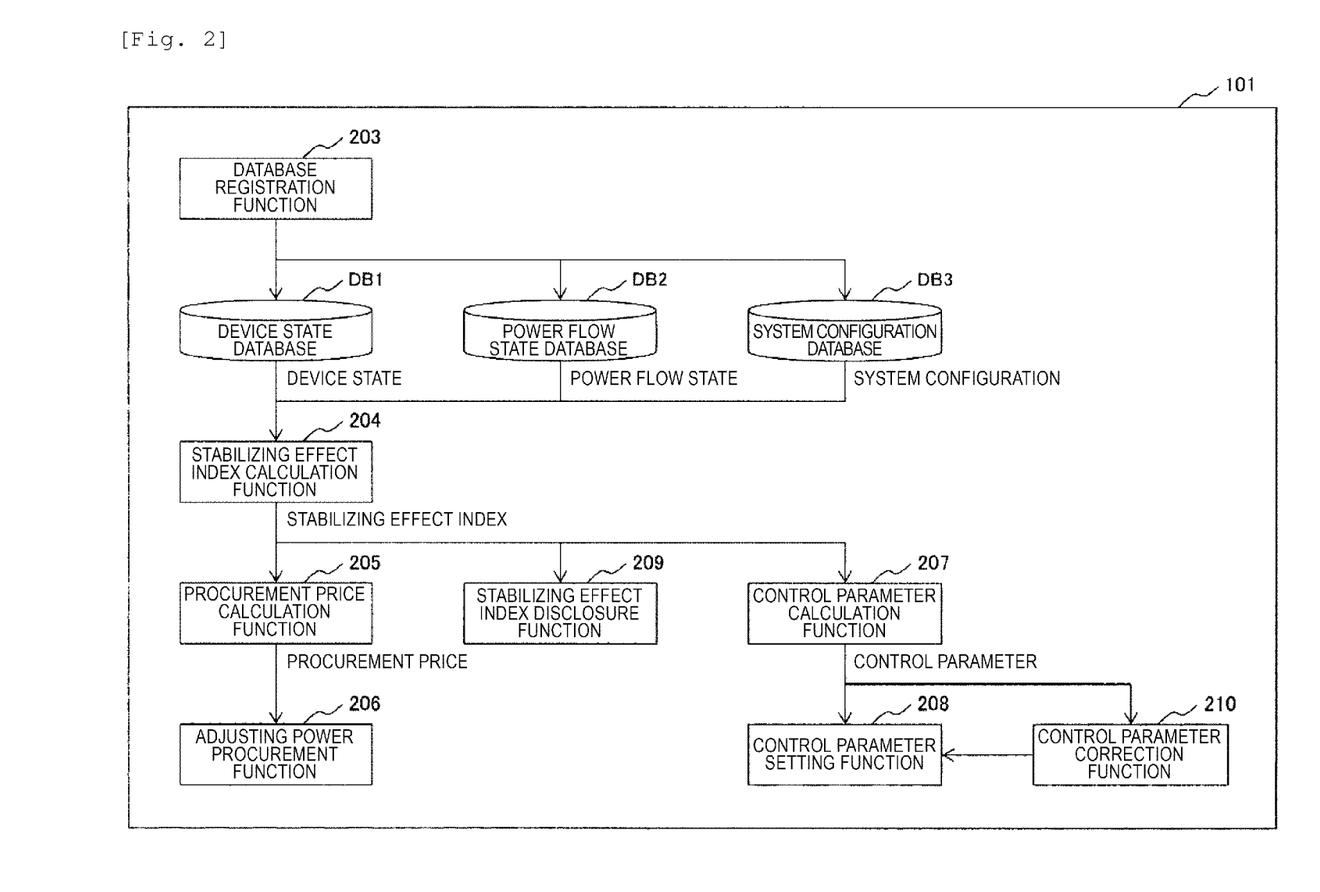
FIG. 2 is a functional configuration diagram of a power system stabilization system.

FIG. 2 is a functional configuration diagram of the system stabilization system 101. In FIG. 2, various processing functions (203 to 210) executed in the system stabilization system 101 and a database DB storing data used for the processing are illustrated.

Among the databases DB, a device state database DB1 is a database in which device states of the stabilizing devices 105 are recorded. The device state is an interconnection position of the stabilizing device, and an output capacitance, response speed, or the like which is dynamically changed. An information source of the device state database DB1 is, for example, a designated value registered via a database registration function 203 with respect to the interconnection position, and is a measurement value obtained by monitoring the stabilizing devices 105 with respect to the output capacitance and the response speed. These indicate a current device state and also indicate a past device state by accumulation. Alternatively, a future device state can also be indicated by registering a predicted value obtained by simulation for assuming the future via the database registration function 203, instead of the measurement value.

A power flow state database DB2 is a database in which a power flow state of the power system 102 is recorded. The power flow state is active power and reactive power which flow through a line of the power system, a line voltage, a phase angle, and an amplitude, a cycle, an occurrence position, or the like of the phase angle fluctuation. The information source of the power flow state database DB2 is a measurement value obtained by monitoring the power system 102. These indicate the current power flow state and also indicate the past power flow state by accumulation. Alternatively, the future power flow state can be indicated by registering a predicted value by simulation for assuming the future via the database registration function 203, instead of the measurement value.

A system configuration database DB3 is a database in which a system configuration of the power system 102 is recorded. The system configuration is a system topology, line impedance, load capacitance, power supply capacitance, a generator constant, and the like. An information source of the system configuration database DB2 is a designated value registered via the database registration function 203. These indicate a current system configuration and also indicate a past system configuration by accumulation. Alternatively, a future system configuration can also be indicated by registering a designated value for assuming the future via the database registration function 203.

Specific processing contents of various processing functions performed in the system stabilization system 101 by using various data accumulated in the databases DB1, DB2, and DB 3 are as follows.

First, the stabilizing effect index calculation function 204 is a function in which the stabilizing devices 105 index stabilizing effects for increasing synchronization stability by attenuating the phase angle fluctuation as a numerical value, based on the device state (device state database DB1), the power flow state (power flow state database DB2), and the system configuration (system configuration database DB3). An example of the stabilizing effect index is a change in an attenuation rate of the phase angle fluctuation with respect to a unit output change of the stabilizing devices 105.

In this case, the stabilizing effect index may be focused on an output capacitance, response speed, and interconnection positions of the stabilizing devices 105 stored in the device state database DB1.

For example, if the output capacitances of the stabilizing devices 105 are focused, the stabilizing devices 105 with a large output capacitance can obtain high stabilizing effects regardless of a magnitude of the phase angle fluctuation. Meanwhile, the stabilizing devices 105 with a small output capacitance can obtain high stabilizing effects with respect to a small-scale phase angle fluctuation, but can obtain only low stabilizing effects due to saturation of an output with respect to a large-scale phase angle fluctuation.

Alternatively, if the response speeds of the stabilizing devices 105 are focused, the stabilizing devices 105 with high response speed obtain high stabilizing effects regardless of the cycle of the phase angle fluctuation. Meanwhile, the stabilizing devices 105 with slow response speed can obtain high stabilizing effects with respect to a long-cycle phase angle fluctuation, but can obtain only low stabilizing effects due to a delay of an output with respect to a short-cycle phase angle fluctuation.

In addition, if the interconnection position of the stabilizing device is focused, an output of the stabilizing device acts on a phase angle of the synchronizing power generator interconnected to various places through an interconnection line power flow, but the closer the interconnection position of the stabilizing device is to an occurrence position of the phase angle fluctuation, the greater the stabilizing effect is.

Figure 3:
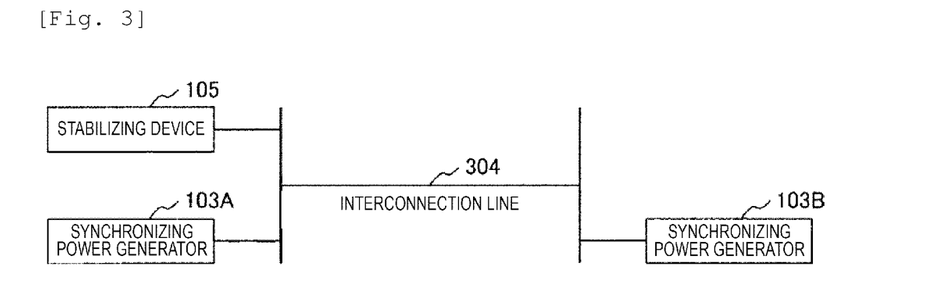
FIG. 3 is a schematic diagram illustrating an electrical distance between a stabilizing device and a synchronizing power generator.

The reason will be schematically described with reference to FIG. 3. In the schematic diagram of FIG. 3, it is assumed that two synchronizing power generators 103A and 103B are connected via an interconnection line 304, and the stabilizing devices 105 are installed near the synchronizing power generator 103A.

Here, a change of the outputs of the stabilizing devices 105 immediately acts as a change of an electrical torque, and the phase angle can be changed, with respect to the synchronizing power generator 103A interconnected to the vicinity of the stabilizing devices 105, and thereby, the phase angle can be changed. Meanwhile, a change of the interconnection line power flow derived from the output of the stabilizing device acts as a change of the electrical torque with respect to the synchronizing power generator 103B interconnected to an end of the interconnection line 304, and thereby, the phase angle is changed. Here, the phase angle has a delay element due to mechanical inertia with respect to the electrical torque, and a magnitude of the power flow of the interconnection line 304 is proportional to a difference between the phase angles of both ends of the interconnection line. That is, the electrical torque acting on the synchronizing power generator 103B has a delay element due to the mechanical inertia, as compared with the electrical torque acting on the synchronizing power generator 103A. Since the delay element causes a decrease of gain in control, the stabilizing effects obtained by the stabilizing devices 105 are lower than the stabilizing effects of the synchronizing power generator 103A, in the synchronizing power generator 103B.

As described above, the stabilizing effects of the stabilizing devices 105 interconnected to the power system is not uniform with respect to the synchronizing power generator, and differs depending on combinations of output capacitance C1i, response speed C2i, and interconnection position C3i of an $i^{th}$ stabilizing device 305, and an amplitude P1k, a cycle P2k, and an occurrence position P3k of the phase angle fluctuation k. Here, a suffix i is a number assigned to the stabilizing device 305. A suffix k is a number for distinguishing the phase angle fluctuation, for example, in a fluctuation mode, and it is known that distinction of the phase angle fluctuation can be made by Prony analysis in which a measurement value of, for example, a PMU (Phasor Measurement Unit) is used as the measurement device 106.

Here, the output capacitance C1i, the response speed C2i, and the interconnection position C3i are data stored in the device state database DB1, and the interconnection position C3i and the occurrence position P3k are data recorded in the system configuration database DB3. In addition, the interconnection position C3i and the occurrence position P3k are indicated by a node number of the system topology recorded in the system configuration database DB3, and the electrical distance between both of them are calculated from the line impedance recorded in the system configuration database DB3.

A stabilizing effect index S(i,k) output from a stabilizing effect index calculation function 204 are functions of these and are described as Formula (1).

[Formula 1]

$$S(i,k)=f(C1i,C2i,C3i,P1k,P2k,P3k) \qquad (1)$$

As an example, the function f in Formula (1) maps the device state and the power flow state to the stabilizing effect index stabilizing effect index S(i,k) by the following function forms. A function form 1 is proportional to the product of the output capacitance C1i of the stabilizing device and the amplitude P1k of the phase angle fluctuation. The function form 2 is proportional to the product of the response speed C2i of the stabilizing device and a reciprocal number of the cycle P2k of the phase angle fluctuation. A function form 3 is proportional to a reciprocal number of the electrical distance between the interconnection position C3i of the stabilizing device and the occurrence position P3i of the phase angle fluctuation.

The larger the output capacitance of the stabilizing device is with respect to the phase angle fluctuation having a large amplitude, the faster the response speed of the stabilizing device is with respect to the phase angle fluctuation having a short cycle, or the closer the electrical distance between the occurrence position of the phase angle fluctuation and a position interconnected to the stabilizing device is, the larger stabilizing effect index is calculated by the function form 1 to the function form 3. An output of the functions can also be easily generated by formulated the function form 1 to the function form 3 in advance, and can also be generated in detail by transient analysis based on a device state of the stabilizing device, a power flow state of the power system, and a system configuration of the power system.

In short, it can be said that Formula (1) is obtained by indexing a stabilizing effect of the stabilizing device on the basis of the device state and the system configuration in a state where the device state database in which the device state of the stabilizing device is recorded and the system configuration database in which the system configuration of the power system is recorded are provided.

In the above example, a case of obtaining S(i,k) as the stabilizing effect index is described, but the stabilizing effect index can be set by an arbitrary stabilizing effect index by a combination of data accumulated in three databases. The stabilizing index may be obtained from data of the device state and data of the power flow state, or the stabilizing index may be obtained from the data of the device state and data of the system configuration. Furthermore, a stabilizing index may be obtained from a combination of three pieces of data. In short, a plurality of different pieces of data may be integrated as one piece of data indicating the stabilizing effect.

A procurement price calculation function 205 of FIG. 2 is a function of calculating a procurement price of the adjusting power by using the stabilizing effect index S(i,k) of the stabilizing device 105. If the procurement price is determined on the basis of the stabilizing effect with respect to a single phase angle fluctuation k, a procurement price V(i,k) of an $i^{th}$ stabilizing device 105 is calculated by a function g of the stabilizing effect index S(i,k) in the same manner as Formula (2). For example, the function g is a monotonically increasing function such as a linear equation of the stabilizing effect index S(i,k), but a function form thereof is not limited.

[Formula 2]

$$V(i,k)=g(S(i,k)) \quad (2)$$

Meanwhile, since a plurality of phase angle fluctuations k may be generated at the same time in an actual power system, the procurement price in which a global stabilizing effect on the power system is considered is not taken in Formula (2). Therefore, the procurement price Vi based on the stabilizing effects on the plurality of phase angle fluctuations k is calculated by Formula (3) which is a linear combination of Formula (2). In Formula (3), N is a number (k=1, 2, . . . , N) of the phase angle fluctuations k occurring in the power system.

Information of the plurality of phase angle fluctuations k is reflected in this case, but the information is data recorded as a power flow state (an amplitude, a cycle, an occurrence position of the phase angle fluctuation) in the power flow state database DB2. For this reason, furthermore, the power flow state database in which the power flow state of the power system is recorded is provided, and the power flow state is reflected.

[Formula 3]

$$Vi=\Sigma k(g(S(i,k))) \quad (3)$$

Here, the procurement price Vi calculated by Formula (3) relatively indicates a magnitude of the procurement price for each stabilizing device 105, but can be set as a procurement price V'i which is obtained by weighting a reference value Vstd in the power transaction market 107 in accordance with a magnitude of the stabilizing effect, for example, by normalizing the procurement price Vi as described in Formula (4). In Formula (4), j is a number (j=1, 2, . . . , M) of stabilizing devices 105 interconnected to the power system.

[Formula 4]

$$V'i=Vstd\times(Vi/\Sigma j(Vj)) \quad (4)$$

As described above, the stabilizing effect index calculation function 204 calculates a stabilizing effect index S(i,k) by using the current device state (device state database DB1), the power flow state (power flow state database DB2), and the system configuration (system configuration database DB3), and thereby, the procurement price calculation function 205 calculates the procurement price based on current performance.

Alternatively, the stabilizing effect index calculation function 204 calculates the stabilizing effect index by using the device state, the power flow state, and the system configuration recorded in the past, and thereby, the procurement price calculation function 205 calculates the procurement price based on a past history.

Alternatively, the stabilizing effect index calculation function 204 calculates the stabilizing effect index by using the device state, the power flow state, and the system configuration assumed in the future, and thereby, the procurement price calculation function 205 calculates the procurement price based on the future assumption.

An adjusting power procurement function 206 of FIG. 2 is a function of presenting the procurement price V'i calculated by the procurement price calculation function 205 at the power transaction market 107, and of procuring adjusting power from an operator of the stabilizing device 105.

The power transaction market 107 itself is already in practical use and thus, description thereof is omitted, but, in the power system stabilization system 101 of the present invention, the procurement price calculated on the basis of the stabilizing effect is used for the transaction, and thus, the adjusting power procurement function 206 procures the adjusting power by prioritizing the stabilizing device 105 with a high stabilizing effect. In Formula (4), the procurement price of the stabilizing device 105a owned by a system stabilization system operator is also included in the calculation as a virtual value for normalization, but in the procurement of the adjusting power performed by the adjusting power procurement function 206, the procurement price of the stabilizing device 105a need not be presented at the power transaction market.

A control parameter calculation function 207 in FIG. 2 is a function of calculating control parameters of the stabilizing device 105a operated by the system stabilization system operator and the stabilizing device 105b procuring the adjusting power at the power transaction market 107. There are a plurality of kinds of control parameters of the stabilizing devices 105, but here, description will be made by using a control gain with respect to a line power flow deviation or a frequency deviation which is an input signal of the stabilizing device 105 as an example.

An output generated by the stabilizing device 105 is proportional to a magnitude of a control gain with respect to the line power flow deviation and the frequency deviation. Therefore, by calculating the control gain on the basis of the stabilizing effect index S(i,k), the stabilizing device 105 with a large stabilizing effect is more positively used, and the phase angle fluctuation occurring in the power system is attenuated.

A method of calculating the control gain which is performed by the control parameter calculation function 207 is described by a function of the stabilizing effect index S(i,k), in the same manner as a method of calculating the procurement price which is performed by the procurement price calculation function 205.

However, since the stabilizing device 105 has a control gain Gstdi which is individually optimized in accordance with the input signal, a control gain G'i of the $i^{th}$ stabilizing device 105 is calculated by Formulas (5) and (6) herein. In this case, the function h is, for example, a monotonically increasing function of a linear equation or the like of the stabilizing effect index S(i,k), but the function form thereof is not limited. In Formula (6), (j=1, 2, . . . , M') is a total number of the stabilizing device 105a owned by the system stabilization system operator and the stabilizing device 105b that procures the adjusting power at the power transaction market 107, among the stabilizing devices interconnected to the power system.

[Formula 5]

$$Gi = \Sigma k(h(S(i,k))) \quad (5)$$

[Formula 6]

$$G'i = Gstdi \times (Gi/\Sigma j(Gj)) \quad (6)$$

Alternatively, in the stabilizing device 105a operated by the system stabilization system operator and the stabilizing device 105b procuring the adjusting power at the power transaction market 107, correction coefficients Ga and Gb are multiplied in the same manner as Formulas (7) and (8), for example, Ga>Gb is satisfied, and thereby, the stabilizing device 105a is more preferentially used than the stabilizing device 105b.

[Formula 7]

$$G'i = Ga \times Gstdi \times (Gi/\Sigma j(Gj)) \quad (7)$$

[Formula 7]

$$G'i = Gb \times Gstdi \times (Gi/\Sigma j(Gj)) \quad (8)$$

A control parameter setting function 208 of FIG. 2 sets the control parameters calculated by the control parameter calculation function 207 to the controllable stabilizing devices 105a and 105b via the communication line 108. As described above, the control parameter calculation function 207 and the control parameter setting function 208 calculate and set the gains of the stabilizing devices 105, increase the outputs of the stabilizing devices 105 with large stabilizing effects, and reduce the outputs of the stabilizing devices 105 with small stabilizing effects, and thus, a total output of the stabilizing devices 105 required to attenuate the phase angle fluctuation is kept low.

The stabilizing effect index disclosure function 209 of FIG. 2 is a function of disclosing the stabilizing effect index S(i,k) which is the basis of the procurement price presented by the adjusting power procurement function 206 at the power transaction market 107, in association with the device state of the stabilizing device 105 and the power flow state of the power system, and uses a display device 109b. As described in Formula (3), the device state and the power flow state are configured with a plurality of elements, and thus, it is not appropriate to present those at once in terms of visibility.

Therefore, the stabilizing effect index disclosure function 209 simplifies the device state and the power flow state, for example, as illustrated in FIGS. 4 to 9, and visualizes those in association with the stabilizing effect index S(i,k).

Figure 4:
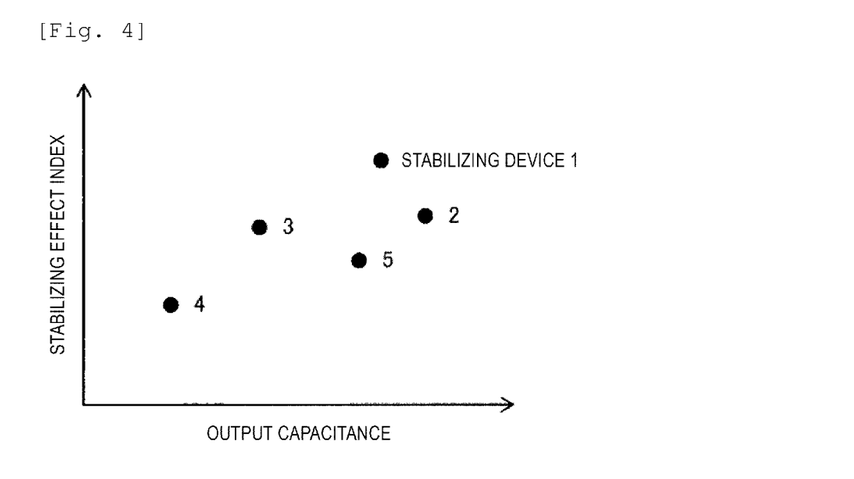
FIG. 4 is a scatter diagram in which a plurality of stabilizing devices are plotted on two axes of an output capacitance and a stabilizing effect index.

FIG. 4 is a graph of a scatter diagram in which a plurality of stabilizing devices are plotted on two axes of the output capacitance and the stabilizing effect index. Here, the stabilizing effect index S(i,k) is an average value of the stabilizing effect indices related to the plurality of phase angle fluctuations calculated by the Formula (3). In the same manner, FIG. 5 is a scatter diagram plotted on two axes of the response speed and the stabilizing effect index.

Figure 5:
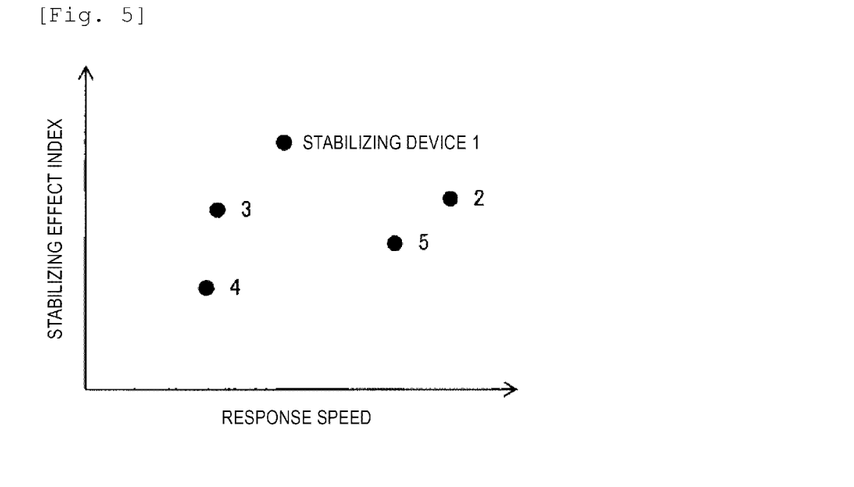
FIG. 5 is a scatter diagram plotted on two axes of response speed and the stabilizing effect index.

Although the scatter diagrams of FIGS. 4 and 5 do not specify a device state contributing to the stabilizing effect respectively and individually, but by visualizing, for example, FIG. 4 and FIG. 5 side by side, it is possible to show a change tendency of the stabilizing effect index with respect to the output capacitance and the response speed, and to quantitatively show the stabilizing device with a high stabilizing effect.

Figure 6:
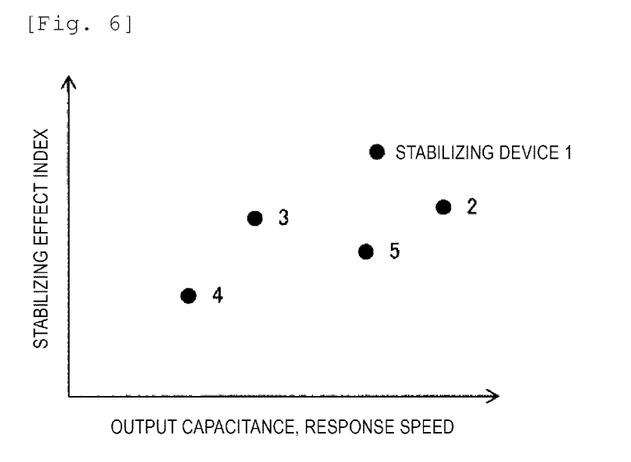
FIG. 6 is a scatter diagram in which the plurality of stabilizing devices are plotted on an axis obtained by linearly combining the output capacitance and the response speed and an axis of the stabilizing effect index.

Alternatively, FIG. 6 is a scatter diagram in which a plurality of stabilizing devices are plotted with respect to an axis obtained by linearly combining the output capacitance and the response speed, and an axis of the stabilizing effect index, and can quantitatively illustrate a stabilizing device with a high stabilizing effect by integrating elements of the device state.

In displaying the visualized stabilizing effect indices, selection of the stabilizing device which is actually used for stabilization control may be generally made by selecting a device with high stabilizing effect index. In addition, since each stabilizing device belongs to the system stabilization system operator and belongs to the stabilizing device operator, distinction of the owner may be displayed to include, in displaying the stabilizing device. If there is no significant difference in the stabilizing effect index between a device belonging to the system stabilization system operator and a device belonging to the stabilizing device operator, there is no need to forcibly proceed with procurement, and it is possible to improve economic feasibility by corresponding to own facilities.

Figure 7:
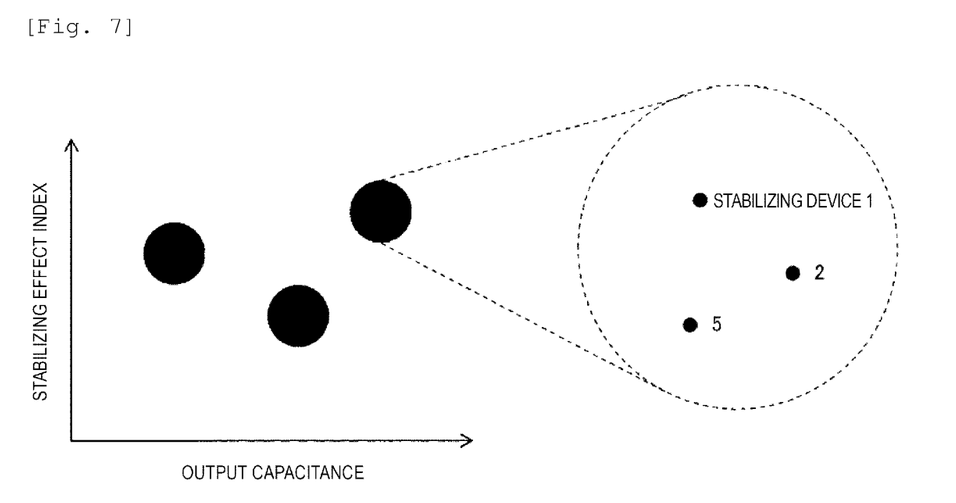

Next, in a case where a large number of stabilizing devices are comparatively shown, stabilizing devices having similar plot coordinates are integrally shown by clustering or the like, a part thereof is expanded as illustrated in FIG. 7, and the stabilizing devices contained in the same cluster can be comparatively shown.

Figure 8:
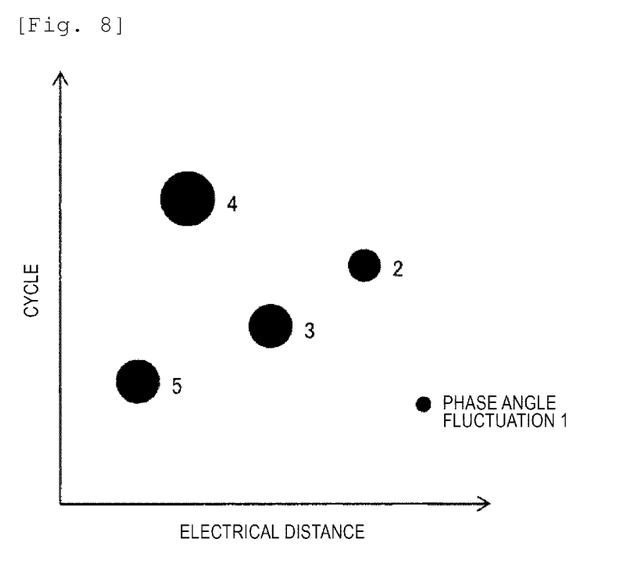
FIG. 8 is a scatter diagram of a bubble chart illustrating the stabilizing effect index of a certain stabilizing device by the size of a circle, on two axes of the electrical distance between an interconnection position of the stabilizing device and an occurrence position of a phase angle fluctuation, and a cycle of the phase angle fluctuation.

A display example of FIG. 8 illustrates an electrical distance between the interconnection position of the stabilizing device and the occurrence position of the phase angle fluctuation on the horizontal axis, illustrates the cycle of the phase angle fluctuation on a vertical axis, and is a graph of a bubble chart illustrating the stabilizing effect indices of a certain stabilizing device by a size of a circle. The graph can quantitatively illustrate whether the stabilizing device has a high stabilizing effect index with respect to any phase angle fluctuation.

Figure 9:
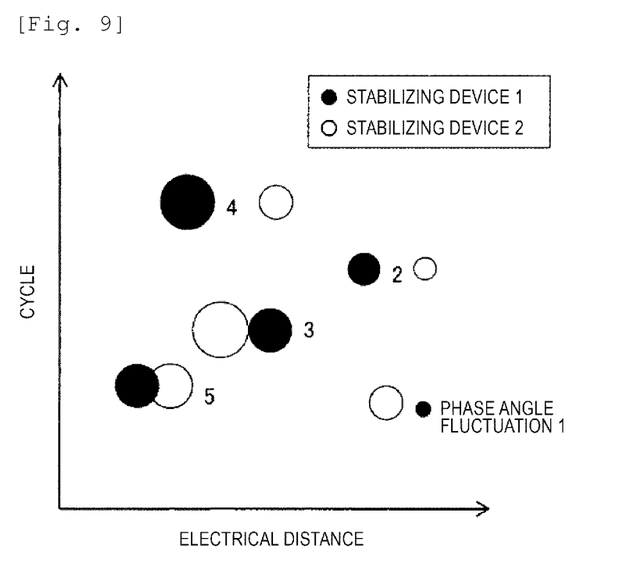
FIG. 9 is a scatter diagram comparatively illustrating the stabilizing effect indices of the plurality of stabilizing devices which are separated by color.

FIG. 8 is a graph related to a single stabilizing device, but the stabilizing effect indices of a plurality of stabilizing devices can also be comparatively illustrated by separating the devices by colors as illustrated in FIG. 9.

The display examples of the stabilizing effect indices are described in FIG. 4 to FIG. 9, but in an actual operation, these are respectively displayed, and in consideration of the system state at the time, the most notable display example may be selected to be used for future determination. For example, in a case where it can be seen that vibration is large as the system state, attention has to be paid to FIGS. 4 and 6 from the viewpoint of capacitance emphasis, and if there are characteristics in which the vibration is fast as the system state, attention has to be paid to FIGS. 5 and 6 from the viewpoint of response emphasis. Furthermore, in a case where it can be seen that the vibration is local as the system state, attention has to be paid to FIGS. 8 and 9 from the viewpoint of the electrical distance. Which figure has to be focused in accordance with the system state may be left to the determination of an operator, or a display screen selected in accordance with determination of a calculator is switchably displayed to make the operator forcibly recognize.

In a case where the display screens are prepared, the device state database in which the device states of the stabilizing devices are recorded, the power flow state database in which the power flow states of the power system are recorded, and the system configuration database in which the system configurations of the power system are recorded are provided, the stabilizing effect of the stabilizing device is indexed on the basis of the device state, the power flow state, and the system configuration, but at this time, it is possible to perform an online display to which current situations are accurately reflected by index on which the device state and the power flow state are focused. In addition, it is possible to perform a display focused on the electrical distance in particular by indexing the stabilizing effect of the stabilizing device on the basis of the device state and the system configuration. For this reason, two or more pieces of data of the device state, the power flow state, and the system configuration may be appropriately combined to be used.

In addition, if it is assumed that, for example, a gas turbine power generator, an SVC, and a distribution power supply can be used as the stabilizing device at a final stage of determining the stabilizing device, the SVC which can perform high speed response is appropriate if there is high speed system fluctuation, the gas turbine power generator with large capacitance is appropriate if there is large scale fluctuation, and the gas turbine power generator, the SVC, and the distribution power supply may be mobilized to correspond if there is high speed and large scale fluctuation.

In addition, in the display examples of FIGS. 4 to 10 described above, the stabilizing effect indices for each stabilizing device are displayed, but not only the stabilizing effect indices are merely displayed, but also two-dimensional or three-dimensional display is performed together with other elements, and other elements contrasted with this case will be referred to as contrasted elements herein. The contrasted elements are the output capacitances of FIG. 4, FIG. 7, and FIG. 10, the response speed of FIG. 5, the output capacitance and the response speed of FIG. 6 and the electrical distances of FIG. 8 and FIG. 9. The contrasted elements are elements included in the device state, the power flow state, and the system configuration, the output capacitance and the response speed are data of the device states stored in the device state database DB1, and the electrical distances are data of the system configurations stored in the system configuration database DB3.

In FIG. 2, a control parameter correction function 210 is a function for an operator of the system stabilization system 101 to correct control parameters automatically calculated by the control parameter calculation function 207, and uses the display device 109$a$ and the operation device 110.

Figure 10:
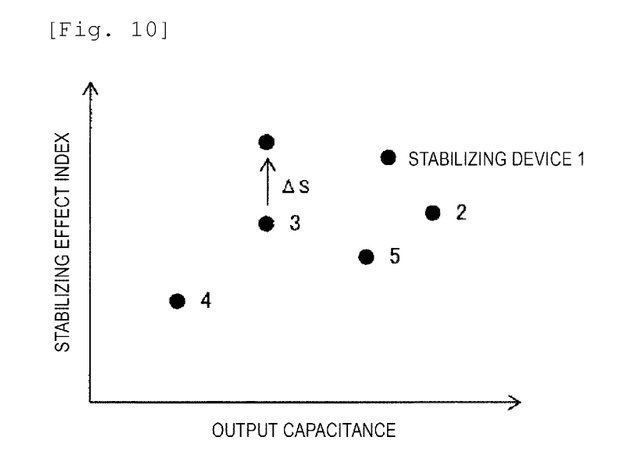
FIG. 10 is a diagram illustrating a control parameter correction method.

For example, S (i, k) becomes S (i, k)+ΔS for visualization, by adding a correction term ΔS to the stabilizing effect index related to a specific stabilizing device on the graph as illustrated in FIG. 10, based on FIG. 4 which is the same as the stabilizing effect index disclosure function 209. Then, the control gain calculated by Formulas (5) and (6) is also corrected, and the operator can correct the output of the stabilizing device. Alternatively, in FIG. 10, instead of plotting the graph by using the stabilizing effect index as an axis, the graph may be plotted by using the control gain as an axis, and the control gain may be directly corrected.

Figure 11:
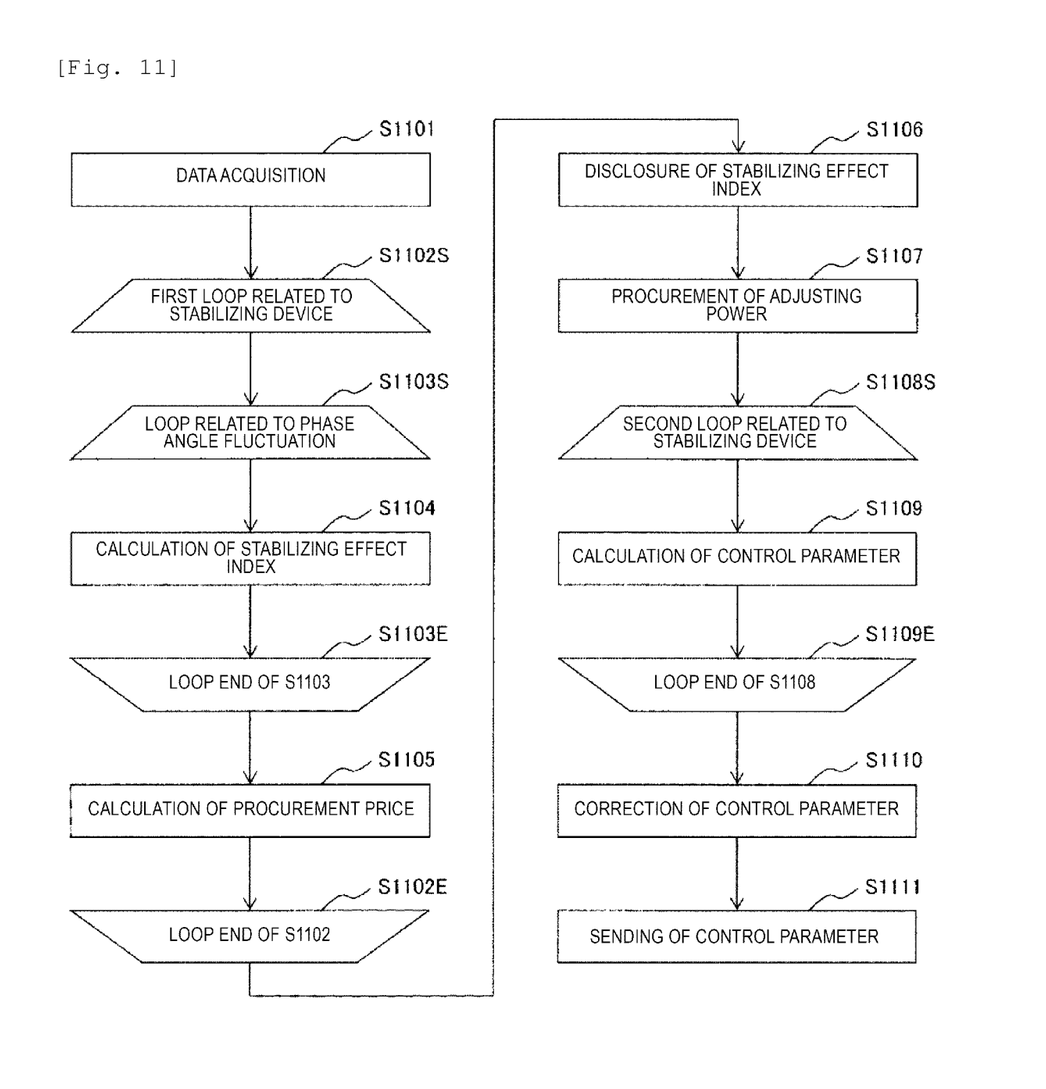
FIG. 11 is a diagram illustrating a processing flow of a power system stabilization system according to an embodiment of the present invention.

FIG. 11 is a processing flow diagram of the system stabilization system 101. Initial processing step S1101 in FIG. 11 is data acquisition processing, and each data of the device state, the power flow state, and the system configuration are read from the device state database DB1, the power flow state database DB2, and the system configuration database DB3.

Next processing step S1102S is first loop processing related to the stabilizing device to be repeatedly performed for all the stabilizing devices 105 which target processing steps between the processing steps S1102S and S1102E. In addition, next processing step S1103S is loop processing related to the phase angle fluctuation repeatedly performed for all of a plurality of phase angle fluctuations which target processing steps between processing steps S1103S and S1103E.

Processing step S1104 is calculation processing of the stabilizing effect index S(i,k) performed by the stabilizing effect index calculation function 204, and calculates the stabilizing effect index S (i, k) with respect to the phase angle fluctuation of a loop processing target related to the phase angle fluctuation, in all the stabilizing devices 105 which are a first loop processing target related to the stabilizing device. By the processing so far, the stabilizing effect indices S(i,k) for all the phase angle fluctuations are calculated in all the stabilizing devices.

Subsequently, processing step S1105 calculates a procurement price of the adjusting power obtained by the procurement price calculation function 205, and calculates the procurement price with respect to the stabilizing device 105 which is the first loop processing target.

Processing step S1106 is the disclosure of the stabilizing effect index S(i,k) generated by the stabilizing effect disclosure function 209, but it can be omitted depending on presence or absence of necessity of the disclosure.

Processing step S1107 is procurement of the adjusting power obtained by the adjusting power procurement function 206, presents the procurement price of the stabilizing device 105 calculated by the procurement price calculation function 205 at the power transaction market, and procures the adjusting power from the operator of the bidding stabilizing device.

Processing step S1108 is second loop processing related to the stabilizing device to be repeatedly performed for all the stabilizing devices 105 which target processing steps between processing steps S1108S and S1108E, and targets the stabilizing device 105a possessed by the system stabilization system operator and the stabilizing device 105b procuring the adjusting power at the power transaction market 107 among the stabilizing devices 105.

Processing step S1109 is calculation of the control parameters performed by the control parameter calculation function 207, and calculates the control parameters with respect to the stabilizing device which is a second loop processing target related to the stabilizing device.

Processing step S1110 is correction of the control parameters performed by the control parameter operation function 210, but it can be omitted depending on presence and absence of necessity of the correction.

Processing step S1111 is setting of the control parameters performed by the control parameter setting function, and sends the control parameters to the stabilizing devices 105a and 105b via the communication line 108.

In a case where a partial configuration is provided which includes, for example, the device state database DB1, the power flow state database DB2, the system configuration database DB3, the stabilizing effect index calculation function 204, the procurement price calculation function 205, and the adjusting power procurement function 206 of FIG. 2, the system stabilization system of the present invention described above has effects in which the stabilizing effect according to the device state of the stabilizing device and the power flow state of the power system are indexed, the adjusting power of the stabilizing device with a large stabilizing effect is prioritized to be procured, and stability of the power system is improved.

In addition to this, in a case where a configuration is provided which includes the control parameter calculation function 207 and the control parameter setting function 208, the stabilizing device can be controlled in accordance with a magnitude of the stabilizing effect, and thus, an effect is obtained in which the stability of the power system is improved.

In addition to this, by providing a configuration which includes the stabilizing effect index disclosure function 209 and the control parameter correction function 210, it is possible to disclose stabilizing effect index with respect to a stakeholder of the stabilizing device operator, and to correct the control parameters which is performed by the operator of the system stabilization system.

REFERENCE SIGNS LIST

101: system stabilization system, 102: power system, 103: power generator, 104: load, 105: stabilizing device, 106: measurement device, 107: power transaction market, 108: communication line, 109: display device, 110: operation device, DB1: device state database, DB2: power flow state database, DB3: system configuration database, 204: stabilizing effect index calculation function, 205: procurement price calculation function, 206: adjusting power procurement function, 207: control parameter calculation function, 208: control parameter setting function, 209: stabilizing effect index disclosure function, 210: control parameter correction function, 203: database registration function, 105: stabilizing device, 103A: synchronizing power generator, 103B: synchronizing power generator, 304: interconnection line

The invention claimed is:

1. A power system stabilization system for operating a stabilizing device interconnected to a power system, comprising:

two or more device state databases including a device state database as a database, among the device state database in which a device state of the stabilizing device is recorded, a power flow state database in which a power flow state of the power system is recorded, and a system configuration database in which a system configuration of the power system is recorded;

a stabilizing effect index calculation function of indexing stabilizing effects of the stabilizing device on the basis of the device state and one or both of the power flow state and the system configuration; and display means which displays or outputs a stabilizing effect index obtained by the stabilizing effect index calculation function in a state where the stabilizing effect index can be shown in contrast with contrasted elements that are included in the device state, the power flow state, or the system configuration;

wherein the stabilizing effect index calculation function indexes the stabilizing effect on a synchronization stability of the power system on the basis of one of (i) an output capacitance and a response speed of the stabilizing device which are recorded in the device state database, or (ii) an output capacitance, a response speed, and an interconnection position of the stabilizing device which are recorded in the device state database.

2. The power system stabilization system according to claim 1, further comprising:

a control parameter calculation function of calculating a control parameter of the stabilizing device on the basis of the stabilizing effect index; and a control parameter setting function of setting the control parameter to the stabilizing device.

3. The power system stabilization system according to claim 2, wherein the control parameter calculation function calculates the control parameter of the stabilizing device which is a supply source of an adjusting power which is procured from a power transaction market.

4. A power system stabilization system for operating a stabilizing device interconnected to a power system, comprising:

two or more device state databases including a device state database as a database, among the device state database in which a device state of the stabilizing device is recorded, a power flow state database in which a power flow state of the power system is recorded, and a system configuration database in which a system configuration of the power system is recorded;

a stabilizing effect index calculation function of indexing stabilizing effects of the stabilizing device on the basis of the device state and one or both of the power flow state and the system configuration; and display means which displays or outputs a stabilizing effect index obtained by the stabilizing effect index calculation function in a state where the stabilizing effect index can be shown in contrast with contrasted elements that are included in the device state, the power flow state, or the system configuration;

wherein the contrasted elements are output capacitance of the stabilizing device, response speed, and an electrical distance between an interconnection position of the stabilizing device and an occurrence position of phase angle fluctuation, and are displayed on a plane having any one or more contrasted elements as one axis together with the stabilizing effect index.

5. The power system stabilization system according to claim 4, further comprising:

a control parameter calculation function of calculating a control parameter of the stabilizing device on the basis of the stabilizing effect index; and a control parameter setting function of setting the control parameter to the stabilizing device.

6. The power system stabilization system according to claim 5, wherein the control parameter calculation function calculates the control parameter of the stabilizing device which is a supply source of an adjusting power which is procured from a power transaction market.

7. The power system stabilization system according to claim 5, wherein the control parameter calculation function calculates the control parameter of the stabilizing device which is a supply source of an adjusting power which is procured from a power transaction market and the control parameter of the stabilizing device which is a supply source of an adjusting power which is operated without passing through a power transaction market.

8. The power system stabilization system according to claim 4, wherein the stabilizing effect index calculation function indexes a stabilizing effect on any one of synchronization stability, voltage stability, and frequency stability.

9. The power system stabilization system according to claim 4, wherein the stabilizing effect index calculation function indexes the stabilizing effect on a synchronization stability of the power system on the basis of an amplitude and a cycle of a phase angle fluctuation which are recorded in the power flow state database.

10. The power system stabilization system according to claim 4, further comprising:

a procurement price calculation function of calculating a procurement price of adjusting power which is an output of the stabilizing device on the basis of the stabilizing effect index; and an adjusting power procurement function of procuring an adjusting power from a power transaction market on the basis of a procurement price.

11. The power system stabilization system according to claim 4, further comprising:

a control parameter calculation function of calculating a control parameter of the stabilizing device on the basis of the stabilizing effect index; and a control parameter setting function of setting the control parameter to the stabilizing device.

12. The power system stabilization system according to claim 4, wherein the stabilizing effect index calculation function indexes a stabilizing effect on any one of synchronization stability, voltage stability, and frequency stability.

13. The power system stabilization system according to claim 4, wherein the stabilizing effect index calculation function indexes the stabilizing effect on a synchronization stability of the power system on the basis of an output capacitance and a response speed of the stabilizing device which are recorded in the device state database.

14. The power system stabilization system according to claim 4, wherein the stabilizing effect index calculation function indexes the stabilizing effect on a synchronization stability of the power system on the basis of an output capacitance, a response speed, and an interconnection position of the stabilizing device which are recorded in the device state database.

15. The power system stabilization system according to claim 4, wherein the stabilizing effect index calculation function indexes the stabilizing effect on a synchronization stability of the power system on the basis of an amplitude and a cycle of the phase angle fluctuation which are recorded in the power flow state database.

16. A power system stabilization system for operating a stabilizing device interconnected to a power system, comprising:

two or more device state databases including a device state database as a database, among the device state database in which a device state of the stabilizing device is recorded, a power flow state database in which a power flow state of the power system is recorded, and a system configuration database in which a system configuration of the power system is recorded;

a stabilizing effect index calculation function of indexing stabilizing effects of the stabilizing device on the basis of the device state and one or both of the power flow state and the system configuration;

display means which displays or outputs a stabilizing effect index obtained by the stabilizing effect index calculation function in a state where the stabilizing effect index can be shown in contrast with contrasted elements that are included in the device state, the power flow state, or the system configuration;

a procurement price calculation function of calculating a procurement price of an adjusting power which is an output of the stabilizing device on the basis of the stabilizing effect index; and an adjusting power procurement function of procuring the adjusting power from a power transaction market on the basis of the procurement price.

17. The power system stabilization system according to claim 16, further comprising:

a control parameter calculation function of calculating a control parameter of the stabilizing device on the basis of the stabilizing effect index; and a control parameter setting function of setting the control parameter to the stabilizing device.

18. The power system stabilization system according to claim 16, wherein the stabilizing effect index calculation function indexes a stabilizing effect on any one of synchronization stability, voltage stability, and frequency stability.

19. The power system stabilization system according to claim 16, wherein the stabilizing effect index calculation function indexes the stabilizing effect on a synchronization stability of the power system on the basis of an output capacitance and a response speed of the stabilizing device which are recorded in the device state database.

20. The power system stabilization system according to claim 5, wherein the stabilizing effect index calculation function indexes the stabilizing effect on a synchronization stability of the power system on the basis of a output capacitance, a response speed, and an interconnection position of the stabilizing device which are recorded in the device state database.

* * * * *